(12) United States Patent
Ali et al.

(10) Patent No.: US 9,274,520 B2
(45) Date of Patent: Mar. 1, 2016

(54) METHOD AND SYSTEM FOR CONDITION MONITORING OF A GROUP OF PLANTS

(71) Applicant: Nuovo Pignone SRL, Florence (IT)

(72) Inventors: Mohamed Ali, Katy, TX (US); Filippo Cinelli, Sesto Fiorentino (IT); Valentina Civelli, Florence (IT); Gianni Mochi, Scandicci (IT); Abdurrahman Khalidi, Doha (QA)

(73) Assignee: Nuovo Pignone SRL, Florence (IT)

( * ) Notice: Subject to any disclaimer, the term of this patent is extended or adjusted under 35 U.S.C. 154(b) by 0 days.

(21) Appl. No.: 14/382,036

(22) PCT Filed: Feb. 28, 2013

(86) PCT No.: PCT/EP2013/054098
§ 371 (c)(1),
(2) Date: Aug. 29, 2014

(87) PCT Pub. No.: WO2013/127958
PCT Pub. Date: Sep. 6, 2013

(65) Prior Publication Data
US 2015/0077263 A1  Mar. 19, 2015

(30) Foreign Application Priority Data
Mar. 1, 2012  (IT) .............. CO2012A0008

(51) Int. Cl.
| G05B 23/02 | (2006.01) |
| F02C 7/00 | (2006.01) |
| G01M 15/14 | (2006.01) |
| G05B 11/06 | (2006.01) |
| H04L 29/08 | (2006.01) |
| F04B 51/00 | (2006.01) |
| G01L 3/10 | (2006.01) |
| F01D 21/00 | (2006.01) |
| G01K 13/00 | (2006.01) |

(52) U.S. Cl.
CPC .......... *G05B 23/0245* (2013.01); *F01D 21/003* (2013.01); *F02C 7/00* (2013.01);
(Continued)

(58) Field of Classification Search
CPC ........... G05B 23/0216; G05B 23/0218; G05B 23/0235; G05B 23/0245; G05B 23/0259; G05B 23/0262; G05B 23/0283; G05B 23/00; G05B 23/02; F01D 21/003; F01D 21/12; F01D 21/14
USPC .............. 340/679, 657, 660, 663, 664, 686.1; 700/21, 83, 286, 287, 291; 709/217, 709/224
See application file for complete search history.

(56) References Cited

U.S. PATENT DOCUMENTS

| 4,249,238 A | 2/1981 | Spang, III et al. |
| 5,806,299 A | 9/1998 | Bauermeister et al. |

(Continued)

FOREIGN PATENT DOCUMENTS

| EP | 0198502 A1 | 10/1986 |
| EP | 2138726 A2 | 12/2009 |

(Continued)

OTHER PUBLICATIONS

U.S. Appl. No. 14/382,028, filed Aug. 29, 2014, David Bianucci.
(Continued)

*Primary Examiner* — Hung T Nguyen
(74) *Attorney, Agent, or Firm* — GE Global Patent Operation

(57) ABSTRACT

A system for monitoring machinery and systems in a process plant using a local monitoring and diagnostic system, the system including a plant database configured to store rule sets including at least one rule expressed as at least one of a physics-based model, a data-driven model, and a empirical model of a plant component and a relational expression of a real-time data output relative to a real-time data input, and a server grade computer configured to receive plant component data from a plant unit control panel, generate virtual sensor outputs using the at least one model associated with the plant component, transmit the plant component data and generated virtual sensor outputs to the plant database for storing and to a data visualization system for generating analytical graphics, determine using the at least one model rule set, an operating or performance condition of the plant component in near real-time.

15 Claims, 10 Drawing Sheets

(52) U.S. Cl.
CPC .............. *F04B 51/00* (2013.01); *G01K 13/00* (2013.01); *G01L 3/10* (2013.01); *G01M 15/14* (2013.01); *G05B 11/06* (2013.01); *G05B 23/0216* (2013.01); *G05B 23/0218* (2013.01); *G05B 23/0283* (2013.01); *H04L 67/10* (2013.01); *F05D 2260/80* (2013.01)

(56) References Cited

U.S. PATENT DOCUMENTS

| | | | |
|---|---|---|---|
| 6,209,310 B1 | 4/2001 | Kuenzi et al. | |
| 6,460,346 B1 | 10/2002 | Cleary | |
| 6,530,207 B2 | 3/2003 | Tobo et al. | |
| 6,658,091 B1* | 12/2003 | Naidoo | G08B 13/19669 379/37 |
| 2005/0033481 A1* | 2/2005 | Budhraja | H02J 3/008 700/286 |
| 2006/0031187 A1* | 2/2006 | Pyrce | G06F 3/04815 |
| 2008/0133679 A1* | 6/2008 | Addy | G06Q 10/107 709/206 |
| 2008/0243352 A1 | 10/2008 | Healy | |
| 2009/0149972 A1 | 6/2009 | Nasle | |
| 2009/0324389 A1 | 12/2009 | Fischetti et al. | |
| 2011/0178737 A1 | 7/2011 | Hudson et al. | |
| 2012/0150335 A1 | 6/2012 | Prabhu et al. | |
| 2013/0103353 A1 | 4/2013 | Kloppner | |

FOREIGN PATENT DOCUMENTS

| | | |
|---|---|---|
| EP | 2345878 A2 | 7/2011 |
| GB | 2085528 A | 4/1982 |
| JP | 476232 A | 3/1992 |
| WO | 2005124491 A1 | 12/2005 |
| WO | 2011003688 A1 | 1/2011 |
| WO | 2011073350 A1 | 6/2011 |
| WO | 102010026678 A1 | 1/2012 |

OTHER PUBLICATIONS

U.S. Appl. No. 14/382,013, filed Aug. 29, 2014, Alberto Ceccherini.
U.S. Appl. No. 14/382,063, filed Aug. 29, 2014, Arul Saravanapriyan.
U.S. Appl. No. 14/382,049, filed Aug. 29, 2014, Ever Avriel Fadlun.
U.S. Appl. No. 14/382,076, filed Aug. 29, 2014, Nicola Giannini.
U.S. Appl. No. 14/382,030, filed Aug. 29, 2014, Arul Saravanapriyan.

Theilliol et al., "A hierarchical fault diagnosis method using a decision support system applied to a chemical plant", Systems, Man and Cybernetics, Intelligent Systems for the 21st Century, IEEE International Conference on Vancouver, BC, Canada, NY, USA, IEEE, US, vol. No. 3, pp. 2205-2210, Oct. 22, 1995.

Wurzbach, "Infrared Thermography of Fan and Compressor Systems in a Predictive Maintenance Program", Proceedings SPIE, Thermosense XX, vol. No. 3361, Apr. 13, 1998.

Bayley, "Flows and temperatures in compressor and turbine wheel spaces", Proceedings of the Institution of Mechanical Engineers, Part C: Journal of Mechanical Engineering Science, vol. No. 213, Issue No. 5, pp. 451-460, May 1, 1999.

Gulen et al., "Real-Time On-Line Performance Diagnostics of Heavy-Duty Industrial Gas Turbines", Journal of Engineering for Gas Turbines and Power, ASME, vol. No. 124, pp. 910-921, Oct. 1, 2002.

Brooks, "GE Gas Turbine Performance Characteristics", GE Power Systems, Oct. 31, 2000.

Davis et al., "Dry Low NOx Combustion Systems for GE Heavy-Duty Gas Turbines", GE Power Systems, Oct. 31, 2000.

Search Report and Written Opinion issued in connection with corresponding IT Application No. CO2012A000008 dated Oct. 22, 2012.

International Search Report and Written Opinion issued in connection with corresponding PCT Application No. PCT/EP2013/054098 dated May 21, 2013.

International Search Report and Written Opinion issued in connection with corresponding PCT Application No. PCT/EP2013/054162 dated Jun. 25, 2013.

International Search Report and Written Opinion issued in connection with corresponding PCT Application No. PCT/2013/054158 dated Jul. 1, 2013.

International Search Report and Written Opinion issued in connection with corresponding PCT Application No. PCT/EP2013/054154 dated Jul. 4, 2013.

International Search Report and Written Opinion issued in connection with corresponding PCT Application No. PCT/EP2013/054161 dated Jul. 9, 2013.

International Search Report and Written Opinion issued in connection with corresponding PCT Application No. PCT/EP2013/054157 dated Jul. 19, 2013.

International Search Report and Written Opinion issued in connection with corresponding PCT Application No. PCT/EP2013/054156 dated Jan. 8, 2014.

\* cited by examiner

FIG. 7

FIG. 9

METHOD AND SYSTEM FOR CONDITION MONITORING OF A GROUP OF PLANTS

BACKGROUND OF THE INVENTION

The field of the invention relates generally to mechanical/electrical equipment operations, monitoring and diagnostics, and more specifically, to systems and methods for monitoring a group of plant equipment locally and selectively monitoring the fleet of plant equipment remotely.

At least some known industrial plants that operate significant numbers of machines monitor and diagnose the health of such machines using a local control system. The local control system may also communicate values of sensed process parameters to an offsite monitoring center for data storage, analysis, and troubleshooting. Typically, the data communicated is relatively old data from a historian and/or is communicated in one direction from the plant to the fleet monitoring center. To take advantage of an equipment supplier's expertise with their equipment that the owner of the plant has purchased, a field service engineer may be required to visit the plant site to observe near real-time data collection and to adjust existing controllers. Plant visits are costly, labor intensive, and difficult to manage on short notice.

BRIEF DESCRIPTION OF THE INVENTION

In one embodiment, a local monitoring and diagnostic system for a plant includes a client system including a user interface and a browser and a plant database configured to store rule sets wherein the rule sets include at least one rule expressed as at least one of a physics-based model, data-driven model, and a empirical model of a plant component or system and a relational expression of a real-time data output relative to a real-time data input. The relational expression is specific to a plant asset or group of inter-related assets. The plant database is further configured to receive event data from a condition monitoring system associated with the plant and the condition monitoring system configured to analyze plant equipment data for real-time optimization of equipment and selected processes, condition monitoring, and event diagnostics to generate the event data. The system also includes a server grade computer configured to communicatively couple to the client system and the database, the server grade computer further configured to receive plant component data from a plant unit control panel communicatively coupled to sensors positioned about the plant component, generate virtual sensor outputs using the at least one of the physics-based model, data-driven model, and a empirical model and the relational expression associated with the plant component or system, transmit the plant component data and generated virtual sensor outputs to the plant database for storing and to a data visualization system for generating analytical graphics as requested by a user of the client system, determine using at least one of the physics-based model, data-driven model, and a empirical model rule set, an operating or performance condition of the plant component or system in near real-time, and output a visualization selected by a user representing the selected plant component or system, the visualization including graphics illustrating the plant component or system and textual information defining values of received and generated data relating to the selected plant component or system.

In another embodiment, a method of monitoring machinery and systems in a process plant using a local monitoring and diagnostic system, the local monitoring and diagnostic system including a database of at least one rule set, the rule set including at least one rule expressed as at least one of a physics-based model, data-driven model, and a empirical model of at least a portion of at least one of a machine, a system, and combinations thereof. The method including receiving from sensors communicatively coupled to the local monitoring and diagnostic system process parameter values relating to an operation of the at least a portion of at least one of a machine and a system in the plant, determining by the local monitoring and diagnostic system virtual sensor values for process parameters relating to the operation of the at least a portion of at least one of a machine and a system in the plant, and generating by the local monitoring and diagnostic system a tiered visualization of graphic representations of the at least a portion of at least one of a machine and a system in the plant including the received process parameter values and virtual sensor values, wherein each tier of visualizations include a graphic representation presented in greater detail than a previous tier.

In yet another embodiment, a monitoring and diagnostic system for a fleet of plants includes a client system associated with each plant, each the client system including a user interface and a browser and a plant database associated with each plant, each plant database configured to store rule sets relative to components located at that plant, the rule sets including at least one rule expressed as at least one of at least one of a physics-based model, data-driven model, and a empirical model of a plant component or system and a relational expression of a real-time data output relative to a real-time data input, the relational expression being specific to a plant asset or group of inter-related assets, the plant database is further configured to receive event data from a condition monitoring system associated with the plant, the condition monitoring system configured to analyze plant equipment data for real-time optimization of equipment and selected processes, condition monitoring, and event diagnostics to generate the event data. The monitoring and diagnostic system also includes a fleet database located remotely from the fleet of plants, the fleet database configured to receive plant performance and operations data from a selectable number of plants in the fleet, the plant performance and operations data including historical plant data and near real-time plant data and a server grade computer configured to communicatively couple to the client systems and the database, the server grade computer further configured to receive plant component data from a plant unit control panel communicatively coupled to sensors positioned about the plant component, generate virtual sensor outputs using the at least one of the physics-based model, data-driven model, and a empirical model, and the relational expression associated with the plant component or system, transmit the plant component data and generated virtual sensor outputs to the plant database for storing and to a data visualization system for generating analytical graphics as requested by a user of the client system, determine using the at least one of the physics-based model, data-driven model, and a empirical model rule set, an operating or performance condition of the plant component or system in near real-time and output a visualization selected by a user representing the selected plant component or system, the visualization including graphics illustrating the plant component or system and textual information defining values of received and generated data relating to the selected plant component or system.

BRIEF DESCRIPTION OF THE DRAWINGS

FIGS. 1-10 show exemplary embodiments of the method and systems described herein.

FIG. 1 is a schematic block diagram of a remote monitoring and diagnostic system in accordance with an exemplary embodiment of the present invention;

FIG. 2 is a block diagram of an exemplary embodiment of a network architecture of a local industrial plant monitoring and diagnostic system, such as a distributed control system (DCS);

FIG. 3 is a block diagram of an exemplary rule set that may be used with LMDS shown in FIG. 1;

FIG. 4 is a data flow block diagram of LMDS in accordance with an exemplary embodiment of the present invention;

FIG. 5 flow diagram of a method of monitoring a condition and performance of components of a fleet of components that may be monitored from LMDS or remote monitoring and diagnostic center;

FIG. 6 is a schematic block diagram of a LMDS communicatively coupled to a plant site and a remote monitoring and diagnostic center;

FIG. 7 is a screen capture of a Tier 1 view that may be viewed through LMDS or remote monitoring and diagnostic system through the network connection;

FIG. 8 is a screen capture of a Tier 2 view that may be viewed after selecting a monitoring tab from Tier 1 view shown in FIG. 7;

FIG. 9 is a screen capture of a Tier 3 view that may be viewed after selecting a performance tab from Tier 1 view shown in FIG. 7 or Tier 2 view shown in FIG. 8; and FIG. 10 is a screen capture of a Tier 4 view depicting vibration pickups in accordance with an exemplary embodiment of the present invention.

DETAILED DESCRIPTION OF THE INVENTION

Figure 1:
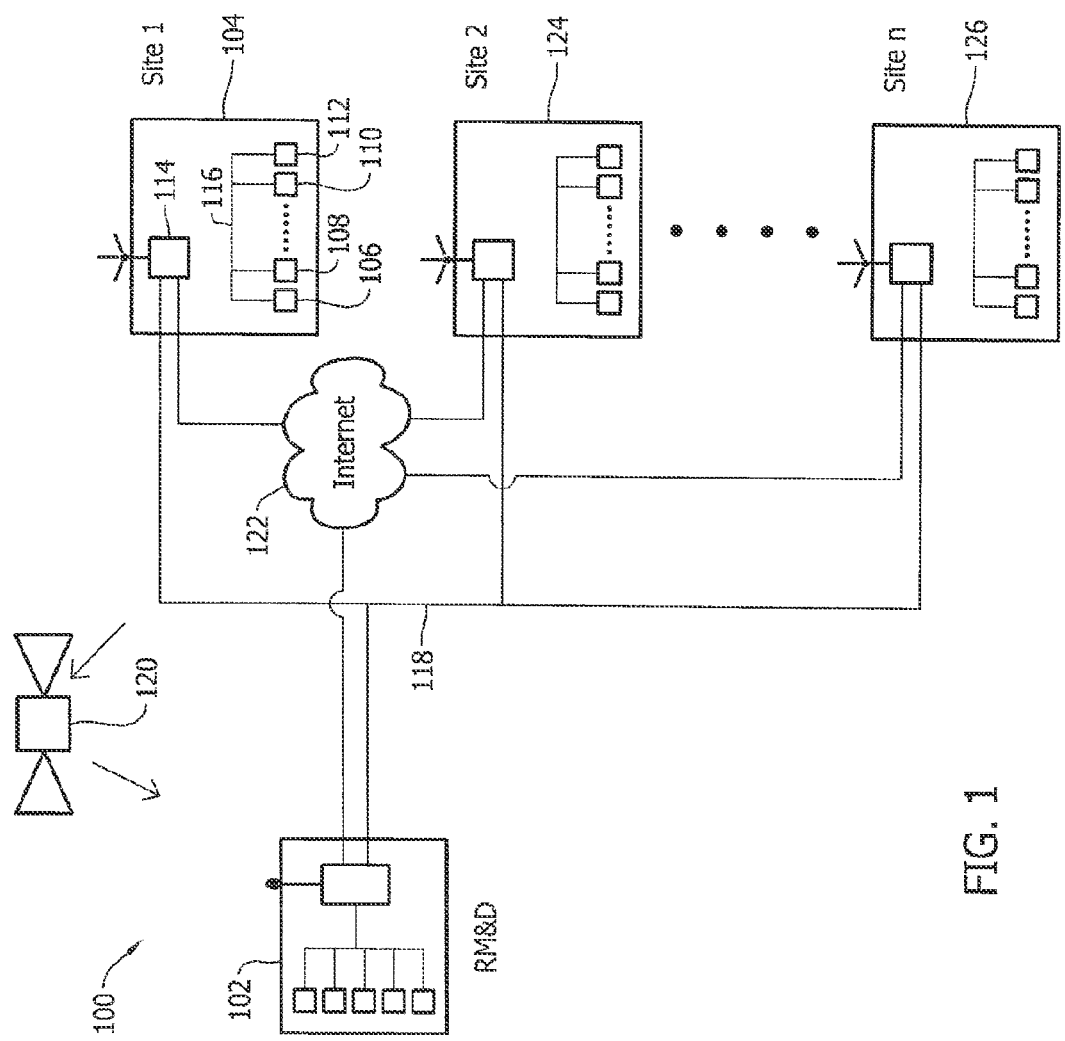

The following detailed description illustrates embodiments of the invention by way of example and not by way of limitation. It is contemplated that the invention has general application to analytical and methodical embodiments of managing plant monitoring and diagnostic systems in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Embodiments of the present disclosure describe a collaborative solution for remotely accessing information relating to the performance and health of oil and gas turbo machinery equipment over networks, such as, but not limited to, the Internet, which is an easy to use, intelligent local monitoring and diagnostic system (LMDS) with embedded advanced original equipment manufacturer (OEM) algorithms and rule sets coupled with advanced visualization features that improved equipment performance while reducing costs and risks.

The LMDS helps avoid unit tripping and determines abnormal performance degradation by identifying issues before they occur and allows for optimization through tailored systems tuning. The LMDS collects operating data, alarm and event information from a unit control panel and a local database stores this information in a central historian and structured query language (SQL) data base and through a predefined equipment service oriented architecture (SOA) data model presents it in a rich graphical format via an internet browser.

Upon login, the user is presented a Tier 1 site level fleet view displaying a health summary for all the lineups or trains that are connected at each site. Main production key performance indicators (KPIs) for example, run status, next planned shutdown as well as quick "right now" charts of output flow availability and reliability calculations are displayed. Lineup colors of the mimic cartoon depict the most severe alarm status present at each unit, red for a high or critical alarm meaning a shutdown or a failed startup, orange for a medium alarm, yellow for a low alarm and green indicating healthy operation. In the exemplary embodiment, a monitoring tab provides a human machine interface (HMI) Tier 2 lineup view containing a list of current KPIs for the gas turbine and compressor. In various embodiments, the monitoring tab provides an HMI Tier 2 lineup view containing a list of current KPIs for other equipment, such as, but not limited to, a steam turbine and generator, or a gas turbine and generator. A status of the machine is shown in a color display as well as the KPIs listed. There are many areas on the screen where the user can drill down for further detail. Clicking on the gas turbine provides the Tier 3 machine view of that gas turbine.

There is also separate, selectable Tier 3 views for each compressor or any other driven equipment. From the Tier 3 view, the user can utilize any number of hyperlinks to drill down for more detail on various probes and measurements. Clicking on a vibration button demonstrates a Tier 4 or component view. The Tier 4 view depicts vibration sensor pickups and from here a user can drill into even more detail, including seismic, axial or radial values of their vibration probes. Further, performance KPIs are displayed on a performance tab. The performance KPIs include thermodynamic performance for both the turbine and the compressor. For a compressor this includes flow and speed. Users can select individual KPI for more in-depth analysis that includes a live or once per minute view of the thermodynamic performance measures, for example, depicting the polytropic efficiency within the operating envelope of the centrifugal compressor. In the live view, blue dots represent the expected level while green show actual. The analysis tab is a feature of the LMDS that when combined with the searchable KPI window permits advanced charting tools to facilitate expert analysis and trouble-shooting. Users can find specific KPIs, view trends from multiple KPIs on a single chart or in side by side charts, customize the time period for data analysis and use the slider to zoom into specific time periods. When satisfied with their analysis the user can add pretext comments, save the analysis as a pdf to send to a customer or peer for discussion and personalize the LMDS by saving the analysis as a favorite for immediate recall at any time in the future.

An alarm and events window is another tool that provides information about current and historical alarms. Here the user can perform any number of tasks including grouping alarms, searching or filtering for specific alarms, viewing advisories, analyzing alarm information by quickly trending the alarm triggering tags, adding a comment to the alarm history, and acknowledging and clearing an alarm. For a diagnostic engineer, the alarm window can be the launch point for any diagnostic work needed to be performed on the train.

An information tab allows the user to have the equipment name plate dated to help identify the different components being monitored. The information tab also includes information associated with the particular asset, such as, but not limited to, service bulletins, as-built drawings, bill of materials (BOM), and field report data. An on-line help feature is fully searchable and can direct users on any aspects of the system.

FIG. 1 is a schematic block diagram of remote monitoring and diagnostic system 100 in accordance with an exemplary embodiment of the present invention. In the exemplary embodiment, system 100 includes a remote monitoring and diagnostic center 102. Remote monitoring and diagnostic center 102 is operated by an entity, such as, an OEM of a plurality of equipment purchased and operated by a separate business entity, such as, an operating entity. In the exemplary embodiment, the OEM and operating entity enter into a support arrangement whereby the OEM provides services related to the purchased equipment to the operating entity. The operating entity may own and operate purchased equipment at a single site or multiple sites. Moreover, the OEM may enter into support arrangements with a plurality of operating entities, each operating their own single site or multiple sites. The multiple sites each may contain identical individual equipment or pluralities of identical sets of equipment, such as trains of equipment. Additionally, at least some of the equipment may be unique to a site or unique to all sites.

In the exemplary embodiment, a first site 104 includes one or more process analyzers 106, equipment monitoring systems 108, equipment local control centers 110, and/or monitoring and alarm panels 112 each configured to interface with respective equipment sensors and control equipment to effect control and operation of the respective equipment. The one or more process analyzers 106, equipment monitoring systems 108, equipment local control centers 110, and/or monitoring and alarm panels 112 are communicatively coupled to an intelligent monitoring and diagnostic system 114 through a network 116. Intelligent monitoring and diagnostic (IMAD) system 114 is further configured to communicate with other on-site systems (not shown in FIG. 1) and offsite systems, such as, but not limited to, remote monitoring and diagnostic center 102. In various embodiments, IMAD 114 is configured to communicate with remote monitoring and diagnostic center 102 using for example, a dedicated network 118, a wireless link 120, and the Internet 122.

Each of a plurality of other sites, for example, a second site 124 and an nth site 126 may be substantially similar to first site 104 although may or may not be exactly similar to first site 104.

Figure 2:
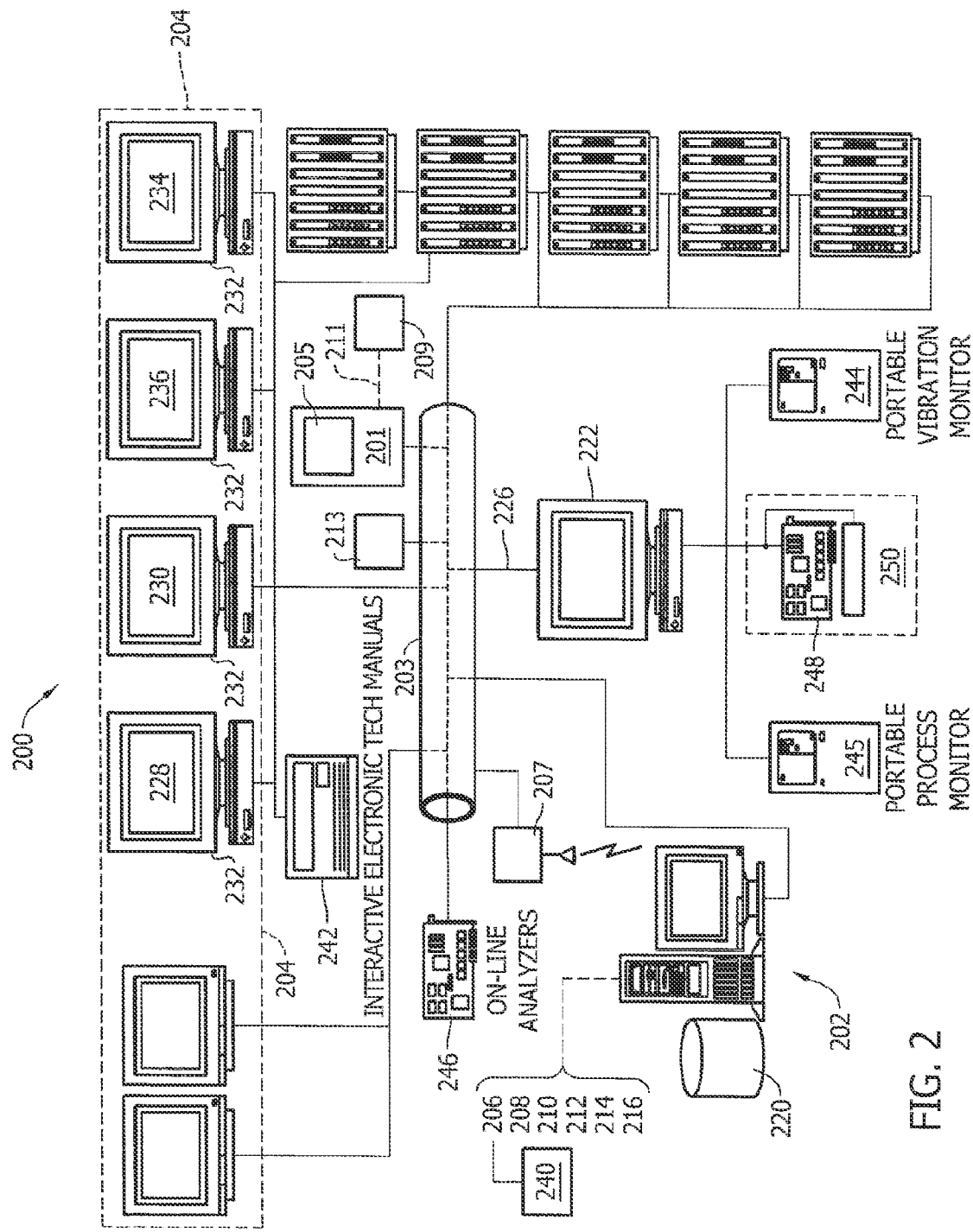

FIG. 2 is a block diagram of an exemplary embodiment of a network architecture 200 of a local industrial plant monitoring and diagnostic system, such as a distributed control system (DCS) 201. The industrial plant may include a plurality of plant equipment, such as gas turbines, centrifugal compressors, gearboxes, generators, pumps, motors, fans, and process monitoring sensors that are coupled in flow communication through interconnecting piping, and coupled in signal communication with DCS 201 through one or more remote input/output (I/O) modules and interconnecting cabling and/or wireless communication. In the exemplary embodiment, the industrial plant includes DCS 201 including a network backbone 203. Network backbone 203 may be a hardwired data communication path fabricated from twisted pair cable, shielded coaxial cable or fiber optic cable, for example, or may be at least partially wireless. DCS 201 may also include a processor 205 that is communicatively coupled to the plant equipment, located at the industrial plant site or at remote locations, through network backbone 203. It is to be understood that any number of machines may be operatively connected to network backbone 203. A portion of the machines may be hardwired to network backbone 203, and another portion of the machines may be wirelessly coupled to backbone 203 via a wireless base station 207 that is communicatively coupled to DCS 201. Wireless base station 207 may be used to expand the effective communication range of DCS 201, such as with equipment or sensors located remotely from the industrial plant but, still interconnected to one or more systems within the industrial plant.

DCS 201 may be configured to receive and display operational parameters associated with a plurality of equipment, and to generate automatic control signals and receive manual control inputs for controlling the operation of the equipment of industrial plant. In the exemplary embodiment, DCS 201 may include a software code segment configured to control processor 205 to analyze data received at DCS 201 that allows for on-line monitoring and diagnosis of the industrial plant machines. Data may be collected from each machine, including gas turbines, centrifugal compressors, pumps and motors, associated process sensors, and local environmental sensors including, for example, vibration, seismic, temperature, pressure, current, voltage, ambient temperature and ambient humidity sensors. The data may be pre-processed by a local diagnostic module or a remote input/output module, or may transmitted to DCS 201 in raw form.

A local monitoring and diagnostic system (LMDS) 213 may be a separate add-on hardware device, such as, for example, a personal computer (PC), that communicates with DCS 201 and other control systems 209 and data sources through network backbone 203. LMDS 213 may also be embodied in a software program segment executing on DCS 201 and/or one or more of the other control systems 209. Accordingly, LMDS 213 may operate in a distributed manner, such that a portion of the software program segment executes on several processors concurrently. As such, LMDS 213 may be fully integrated into the operation of DCS 201 and other control systems 209. LMDS 213 analyzes data received by DCS 201, data sources, and other control systems 209 to determine an operational health of the machines and/or a process employing the machines using a global view of the industrial plant.

In the exemplary embodiment, network architecture 100 includes a server grade computer 202 and one or more client systems 203. Server grade computer 202 further includes a database server 206, an application server 208, a web server 210, a fax server 212, a directory server 214, and a mail server 216. Each of servers 206, 208, 210, 212, 214, and 216 may be embodied in software executing on server grade computer 202, or any combinations of servers 206, 208, 210, 212, 214, and 216 may be embodied alone or in combination on separate server grade computers coupled in a local area network (LAN) (not shown). A data storage unit 220 is coupled to server grade computer 202. In addition, a workstation 222, such as a system administrator's workstation, a user workstation, and/or a supervisor's workstation are coupled to network backbone 203. Alternatively, workstations 222 are coupled to network backbone 203 using an Internet link 226 or are connected through a wireless connection, such as, through wireless base station 207.

Each workstation 222 may be a personal computer having a web browser. Although the functions performed at the workstations typically are illustrated as being performed at respective workstations 222, such functions can be performed at one of many personal computers coupled to network backbone 203. Workstations 222 are described as being associated with separate exemplary functions only to facilitate an understanding of the different types of functions that can be performed by individuals having access to network backbone 203.

Server grade computer 202 is configured to be communicatively coupled to various individuals, including employees 228 and to third parties, e.g., service providers 230. The communication in the exemplary embodiment is illustrated as being performed using the Internet, however, any other wide area network (WAN) type communication can be utilized in other embodiments, i.e., the systems and processes are not limited to being practiced using the Internet.

In the exemplary embodiment, any authorized individual having a workstation 232 can access LMDS 213. At least one of the client systems may include a manager workstation 234 located at a remote location. Workstations 222 may be embodied on personal computers having a web browser. Also, workstations 222 are configured to communicate with server grade computer 202. Furthermore, fax server 212 communicates with remotely located client systems, including a client system 236 using a telephone link (not shown). Fax server 212 is configured to communicate with other client systems 228, 230, and 234, as well.

Computerized modeling and analysis tools of LMDS 213, as described below in more detail, may be stored in server 202 and can be accessed by a requester at any one of client systems 204. In one embodiment, client systems 204 are computers including a web browser, such that server grade computer 202 is accessible to client systems 204 using the Internet. Client systems 204 are interconnected to the Internet through many interfaces including a network, such as a local area network (LAN) or a wide area network (WAN), dial-in-connections, cable modems and special high-speed ISDN lines. Client systems 204 could be any device capable of interconnecting to the Internet including a web-based phone, personal digital assistant (PDA), or other web-based connectable equipment. Database server 206 is connected to a database 240 containing information about industrial plant 10, as described below in greater detail. In one embodiment, centralized database 240 is stored on server grade computer 202 and can be accessed by potential users at one of client systems 204 by logging onto server grade computer 202 through one of client systems 204. In an alternative embodiment, database 240 is stored remotely from server grade computer 202 and may be non-centralized.

Other industrial plant systems may provide data that is accessible to server grade computer 202 and/or client systems 204 through independent connections to network backbone 204. An interactive electronic tech manual server 242 services requests for machine data relating to a configuration of each machine. Such data may include operational capabilities, such as pump curves, motor horsepower rating, insulation class, and frame size, design parameters, such as dimensions, number of rotor bars or impeller blades, and machinery maintenance history, such as field alterations to the machine, as-found and as-left alignment measurements, and repairs implemented on the machine that do not return the machine to its original design condition.

A portable vibration monitor 244 may be intermittently coupled to LAN directly or through a computer input port such as ports included in workstations 222 or client systems 204. Typically, vibration data is collected in a route, collecting data from a predetermined list of machines on a periodic basis, for example, monthly or other periodicity. Vibration data may also be collected in conjunction with troubleshooting, maintenance, and commissioning activities. Further, vibration data may be collected continuously in a real-time or near real-time basis. Such data may provide a new baseline for algorithms of LMDS 213. Process data may similarly, be collected on a route basis or during troubleshooting, maintenance, and commissioning activities. Moreover, some process data may be collected continuously in a real-time or near real-time basis. Certain process parameters may not be permanently instrumented and a portable process data collector 245 may be used to collect process parameter data that can be downloaded to DCS 201 through workstation 222 so that it is accessible to LMDS 213. Other process parameter data, such as process fluid composition analyzers and pollution emission analyzers may be provided to DCS 201 through a plurality of on-line monitors 246.

Electrical power supplied to various machines or generated by generated by generators with the industrial plant may be monitored by a motor protection relay 248 associated with each machine. Typically, such relays 248 are located remotely from the monitored equipment in a motor control center (MCC) or in switchgear 250 supplying the machine. In addition, to protection relays 248, switchgear 250 may also include a supervisory control and data acquisition system (SCADA) that provides LMDS 213 with power supply or power delivery system (not shown) equipment located at the industrial plant, for example, in a switchyard, or remote transmission line breakers and line parameters.

Figure 3:
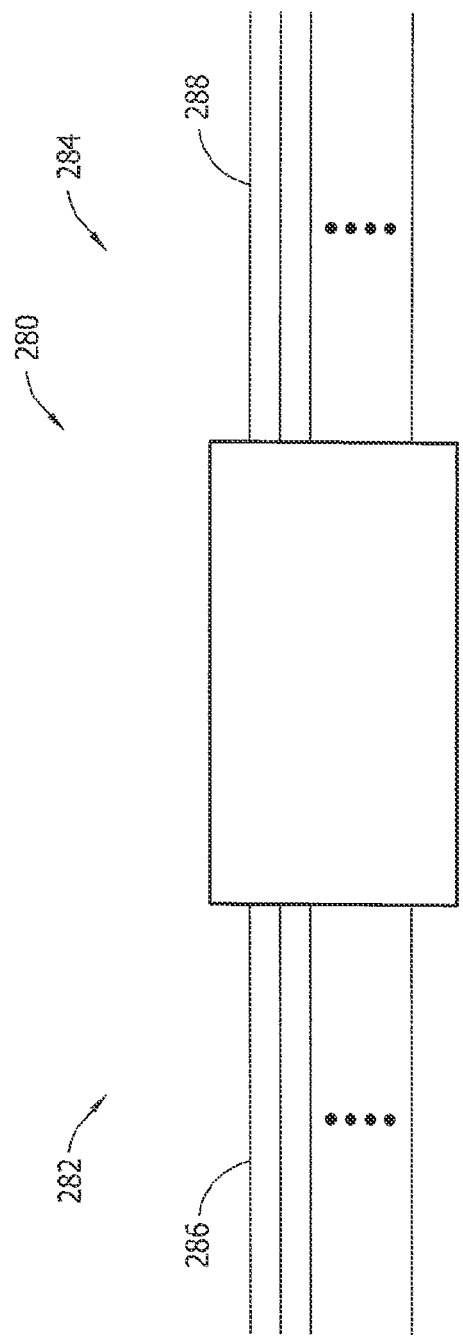

FIG. 3 is a block diagram of an exemplary rule set 280 that may be used with LMDS 213 (shown in FIG. 1). Rule set 280 may be a combination of one or more custom rules, and a series of properties that define the behavior and state of the custom rules. The rules and properties may be bundled and stored in a format of an XML string, which may be encrypted based on a 25 character alphanumeric key when stored to a file. Rule set 280 is a modular knowledge cell that includes one or more inputs 282 and one or more outputs 284. Inputs 282 may be software ports that direct data from specific locations in LMDS 213 to rule set 280. For example, an input from a pump outboard vibration sensor may be transmitted to a hardware input termination in DCS 201. DCS 201 may sample the signal at that termination to receive the signal thereon. The signal may then be processed and stored at a location in a memory accessible and/or integral to DCS 201. A first input 286 of rule set 280 may be mapped to the location in memory such that the contents of the location in memory is available to rule set 280 as an input. Similarly, an output 288 may be mapped to another location in the memory accessible to DCS 201 or to another memory such that the location in memory contains the output 288 of rule set 280.

In the exemplary embodiment, rule set 280 includes one or more rules relating to monitoring and diagnosis of specific problems associated with equipment operating in an industrial plant, such as, for example, a gas reinjection plant, a liquid natural gas (LNG) plant, a power plant, a refinery, and a chemical processing facility. Although rule set 280 is described in terms of being used with an industrial plant, rule set 280 may be appropriately constructed to capture any knowledge and be used for determining solutions in any field. For example, rule set 280 may contain knowledge pertaining to economic behavior, financial activity, weather phenomenon, and design processes. Rule set 280 may then be used to determine solutions to problems in these fields. Rule set 280 includes knowledge from one or many sources, such that the knowledge is transmitted to any system where rule set 280 is applied. Knowledge is captured in the form of rules that relate outputs 284 to inputs 282 such that a specification of inputs 282 and outputs 284 allows rule set 280 to be applied to LMDS 213. Rule set 280 may include only rules specific to a specific plant asset and may be directed to only one possible problem associated with that specific plant asset. For example, rule set 280 may include only rules that are applicable to a motor or a motor/pump combination. Rule set 280 may only include rules that determine a health of the motor/pump combination using vibration data. Rule set 280 may also include rules that determine the health of the motor/pump combination using a suite of diagnostic tools that include, in addition to vibration analysis techniques, but may also include, for example, performance calculational tools and/or financial calculational tools for the motor/pump combination.

In operation, rule set 280 is created in a software developmental tool that prompts a user for relationships between inputs 282 and outputs 284. Inputs 282 may receive data representing, for example digital signals, analog signals, waveforms, processed signals, manually entered and/or configuration parameters, and outputs from other rule sets. Rules within rule set 280 may include logical rules, numerical algorithms, application of waveform and signal processing techniques, expert system and artificial intelligence algorithms, statistical tools, and any other expression that may relate outputs 284 to inputs 282. Outputs 284 may be mapped to respective locations in the memory that are reserved and configured to receive each output 284. LMDS 213 and DCS 201 may then use the locations in memory to accomplish any monitoring and/or control functions LMDS 213 and DCS 201 may be programmed to perform. The rules of rule set 280 operate independently of LMDS 213 and DCS 201, although inputs 282 may be supplied to rule set 280 and outputs 284 may be supplied to rule set 280, directly or indirectly through intervening devices.

During creation of rule set 280, a human expert in the field divulges knowledge of the field particular to a specific asset using a development tool by programming one or more rules. The rules are created by generating expressions of relationship between outputs 284 and inputs 282 such that no coding of the rules is needed. Operands may be selected from a library of operands, using graphical methods, for example, using drag and drop on a graphical user interface built into the development tool. A graphical representation of an operand may be selected from a library portion of a screen display (not shown) and dragged and dropped into a rule creation portion. Relationships between input 282 and operands are arranged in a logical display fashion and the user is prompted for values, such as, constants, when appropriate based on specific operands and specific ones of inputs 282 that are selected. As many rules that are needed to capture the knowledge of the expert are created. Accordingly, rule set 280 may include a robust set of diagnostic and/or monitoring rules or a relatively less robust set of diagnostic and/or monitoring rules based on a customers requirements and a state of the art in the particular field of rule set 280. The development tool provides resources for testing rule set 280 during the development to ensure various combinations and values of inputs 282 produce expected outputs at outputs 284. To protect the knowledge or intellectual property captured in rule set 280, a developmental encryption code may be used to lock rule set 280 from being altered except by those in possession of the encryption key. For example, the creator of rule set 280 may keep the encryption key to lockout end users of rule set 280, the creator may sell the encryption key or license it for a period of time, to the end user or third parties, who may then provides services to the end user.

After development, rule set 280 may enter a distribution mode wherein rule set 280 is converted to a transmittable form, for example, a XML file that may be transmitted to a customer via e-mail, CD-ROM, link to an Internet site, or any other means for transmission of a computer readable file. Rule set 280 may be encrypted with a distribution encryption code that may prevent the use of rule set 280 unless the end user is authorized by the creator, for example, by purchasing a distribution encryption key. Rule set 280 may be received by an end user through any means by which a computer readable file may be transmitted. A rule set manager which, may be a software platform that forms a portion of LMDS 213, may receive the distributable form of rule set 280 and convert it to a format usable by LMDS 213. A graphical user interface permits an end user to manipulate one or more rule sets 280 as objects. Rule set 280 may be applied such that inputs 282 and corresponding locations in memory are mapped correctly and outputs 284 and their corresponding locations in memory are mapped correctly. When initially applied, rule set 280 may be placed into a trial mode wherein rule set 280 operates as created except that notifications of anomalous behavior that may be detected by rule set 280 are not distributed or distributed on a limited basis. During the trial mode, quality certifications may be performed to ensure rule set 280 operates correctly in an operating environment. When quality certification is complete, rule set 280 may be placed into commission wherein rule set 280 operates on LMDS 213 with full functionality of the rules within rule set 280. In another embodiment, rule set 280 includes a life cycle with only two modes, a trial mode and a live mode. In the trial mode, rules run normally except there are no events generated or notifications sent, and the live mode is substantially similar to being placed in commission.

In the exemplary embodiment, rule sets may include one or more of the following:

Gas Turbine Availability Rule Sets:
1. Wheel Space Temperature
2. Exhaust Temp Check
3. Exhaust Temp Spread
4. Faulty Comb Locator
5. DLN Transfer
6. Flame Detector Monitoring
7. Lube Oil Temp
8. Inlet Filter
9. Compressor Pressure Ratio
10. IBV/IGV/IBH/GCV/FPG Rule for detecting Transmitter problems.

Gas Turbine Performance Rule Sets:
1. Axial Comp Efficiency
2. Axial Comp Flow
3. Output power Degradation
4. Heat Rate Degradation
5. Part Load Fuel Consumption Centrifugal Compressor Availability Rule Sets:
Primary Seal Gas System Availability Rule Sets:
1. Dirt in gas filters
2. PDV malfunction (DE)
3. PDV malfunction (NDE)
4. Secondary Seal PDV malfunction
5. Tertiary seal PV malfunction
6. Ampliflow gasket failure
7. Local leakage around the panel
8. Heater failure Dry Gas Seal Cartridges Availability Rule Sets:
9. Coalescer failure
10. Primary seal cartridge damage DE
11. Primary seal cartridge damage NDE
12. Secondary seal cartridge damage DE
13. Secondary seal cartridge damage NDE
14. Hydrocarbon condensation
15. Seal gas escape through secondary vent (local)
16. Primary seal stuck open DE
17. Primary seal stuck open NDE
18. End seal increased clearance DE
19. End seal increased clearance NDE
20. Secondary seal stuck open DE
21. Secondary seal stuck open NDE Primary Vent System
22. Flare pressure low
23. Flare pressure high
Separation Gas System Availability
24. Tertiary seal failure (oil migration)
Nitrogen Supply System
25. Failure of Nitrogen Supply System
Centrifugal Compressor Performance Rule Sets:
1. Actual Performance
2. Expected Performance
3. Efficiency Drop alarm
4. Head Coeff Delta
5. Flow Coeff Delta
6. Suction Condition In one embodiment, the wheelspace temperature rule set is configured to calculate an expected wheelspace temperature with respect to operating conditions of the gas turbine engine. The benefit of the wheelspace temperature rule set is a predictive and adaptable threshold that links different GT components and Compressor Performance to predict the upper and lower bounds on the expected wheelspace temperature.

The combustor swirl angle rule set is configured to evaluate the angle between the measured representative exhaust gas temperature, at varying loads, and the combustor source-location to identify the location of the probable faulty combustor.

The exhaust temperature spread rule set is configured to correctly identify the hot/cold spots in the exhaust temperature profile at each combustion mode and at varying loads, and define the exhaust temperature anomaly through a predetermined threshold to precisely define the spread anomaly and link it to combustion mode and load.

The secondary flame detector monitoring rule set is configured to predict a faulty flame detector based on monitoring the analog and digital signals to avoid trips due to faulty sensors.

The axial compressor efficiency rule set is configured to calculate online the axial compressor efficiency, at steady state conditions, and monitor the degradation over time.

The axial compressor flow efficiency rule set is configured to calculate online the axial compressor flow efficiency, corrected to ISO conditions and 100% speed, and monitor the degradation over time.

The gas turbine output power degradation rule set is configured to calculate the actual output power, corrected to ISO conditions and 100% speed, compared to initial reference value using gas turbine engine performance maps, to avoid reduction in output power.

The gas turbine heat rate degradation rule set is configured to calculate the actual heat rate, corrected to ISO conditions and 100% speed, compared to initial reference value using gas turbine engine performance maps, to avoid excessive heat rate.

Figure 4:
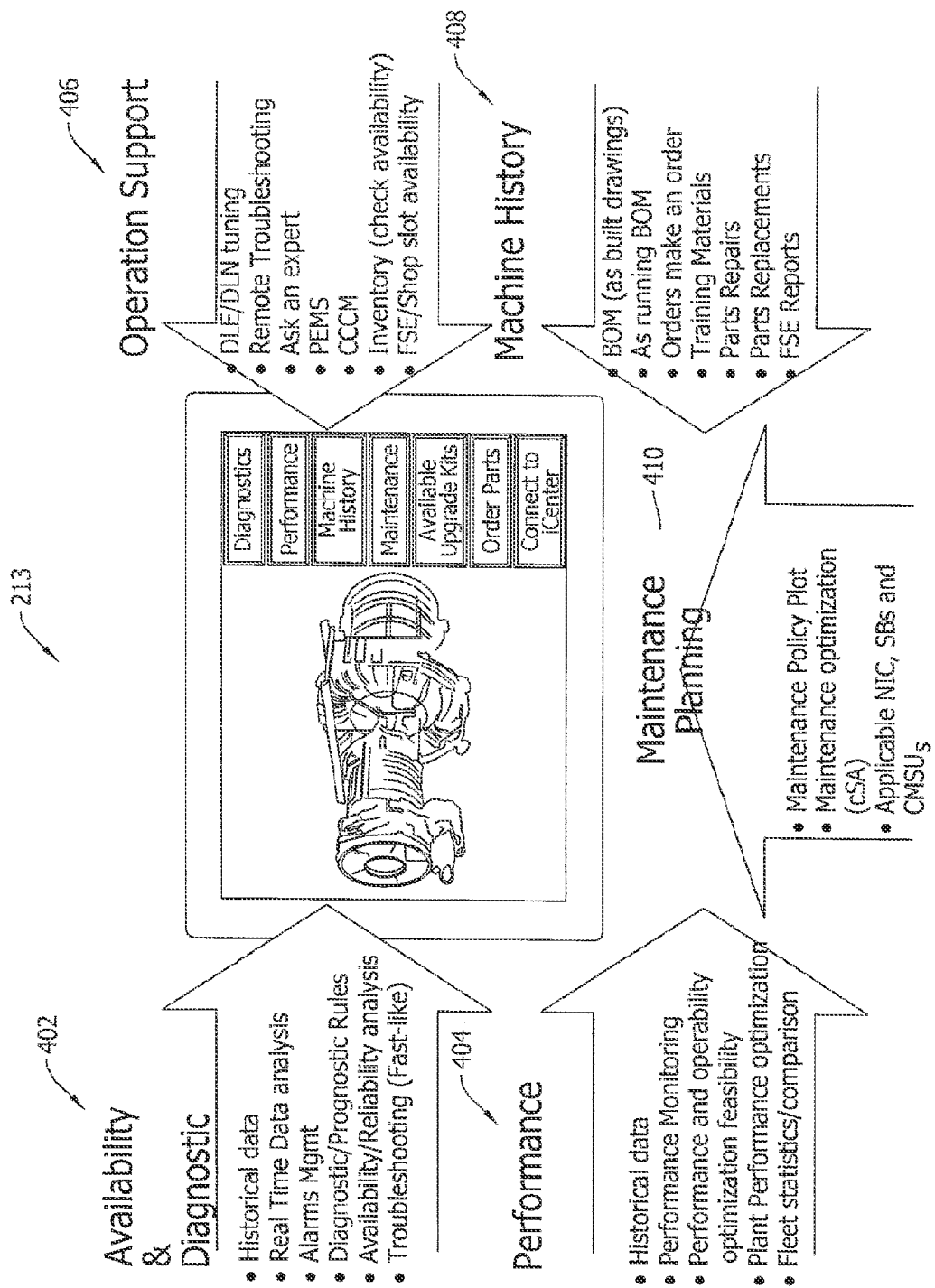

FIG. 4 is a data flow block diagram of LMDS 213 in accordance with an exemplary embodiment of the present invention. In the exemplary embodiment, LMDS 213 includes a plurality of modules. A first availability and diagnostic module 402 is configured to receive historical data and near real-time data and to perform real time data analysis using for example, but not limited to alarms management, diagnostic/prognostic rules, availability/reliability analysis, and troubleshooting. A performance module 404 is configured to receive historical data and near real-time data and to perform performance monitoring, performance and operability optimization feasibility, plant performance optimization, and fleet statistics/comparison. LMDS 213 also includes an operation support module 406 configured to facilitate dry low emissions (DLE) and dry low $NO_x$ (DLN) remote tuning operations, remote troubleshooting, from for example a fleet center such as remote monitoring and diagnostic center 102, predictive emissions monitoring (PEMS), checking inventory availability and shop availability. LMDS 213 also includes a machine history module 408 that facilitates tracking a bill of material (BOM) for selected ones of the components in a plant site, both design and as-built. Machine history module 408 is further configured to facilitate tracking orders, making orders, tracking training materials, tracking parts for repairs and replacements, and field service engineer (FSE) reports. LMDS 213 also includes a maintenance planning module 410 that is configured to maintain a maintenance policy plot, maintenance optimization, and applicable NICs, service bulletins (SB), and conversions, modifications & uprates (CM&U)

Figure 5:
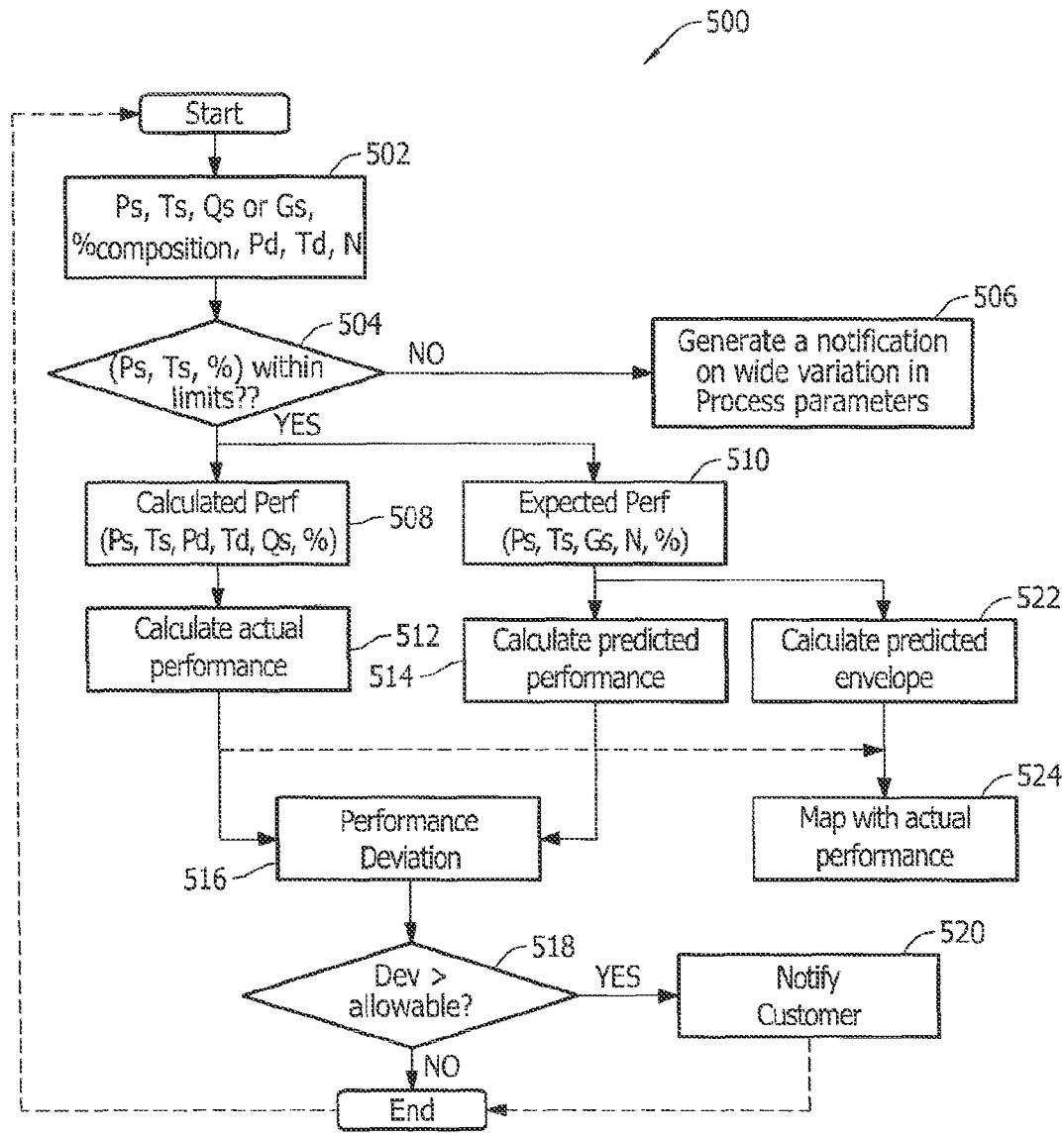

FIG. 5 flow diagram of a method 500 of monitoring a condition and performance of components of a fleet of components that may be monitored from LMDS 213 or remote monitoring and diagnostic center 102. In the exemplary embodiment, method 500 is executed using one or more rule sets, which may execute in series with respect to each other, in parallel, or combinations thereof. During each execution of the rule sets, the rule sets receive 502 a plurality of inputs based on the inputs 286 configured to be used in each rule set. The inputs may be received directly from a sensor, DCS 201, a sensor control panel, a data acquisition system, or a historian, or other database. The inputs may represent historical data, near real-time data, or combinations thereof based on the programming of each rule set. The inputs are checked 504 to be within predetermined limits and if not, a notification is generated 506 to alert the operators of a wide variation in one or more of the process parameters. If the inputs, as received, are within the predetermined limits, a calculated performance is determined 508 using the received inputs and an expected performance is determined 510. An actual performance is calculated 512 and an expected performance is calculated 514 and the actual performance and the expected performance are compared 516 to generate a performance deviation. If the performance deviation is greater than a predetermined allowable 518, a customer associated with the component or system having the performance deviation that is greater then the predetermined allowable deviation is alerted 520 to the condition. Using the calculated expected performance, a predicted envelope is calculated 522 and is mapped 524 to the calculated actual performance.

Figure 6:
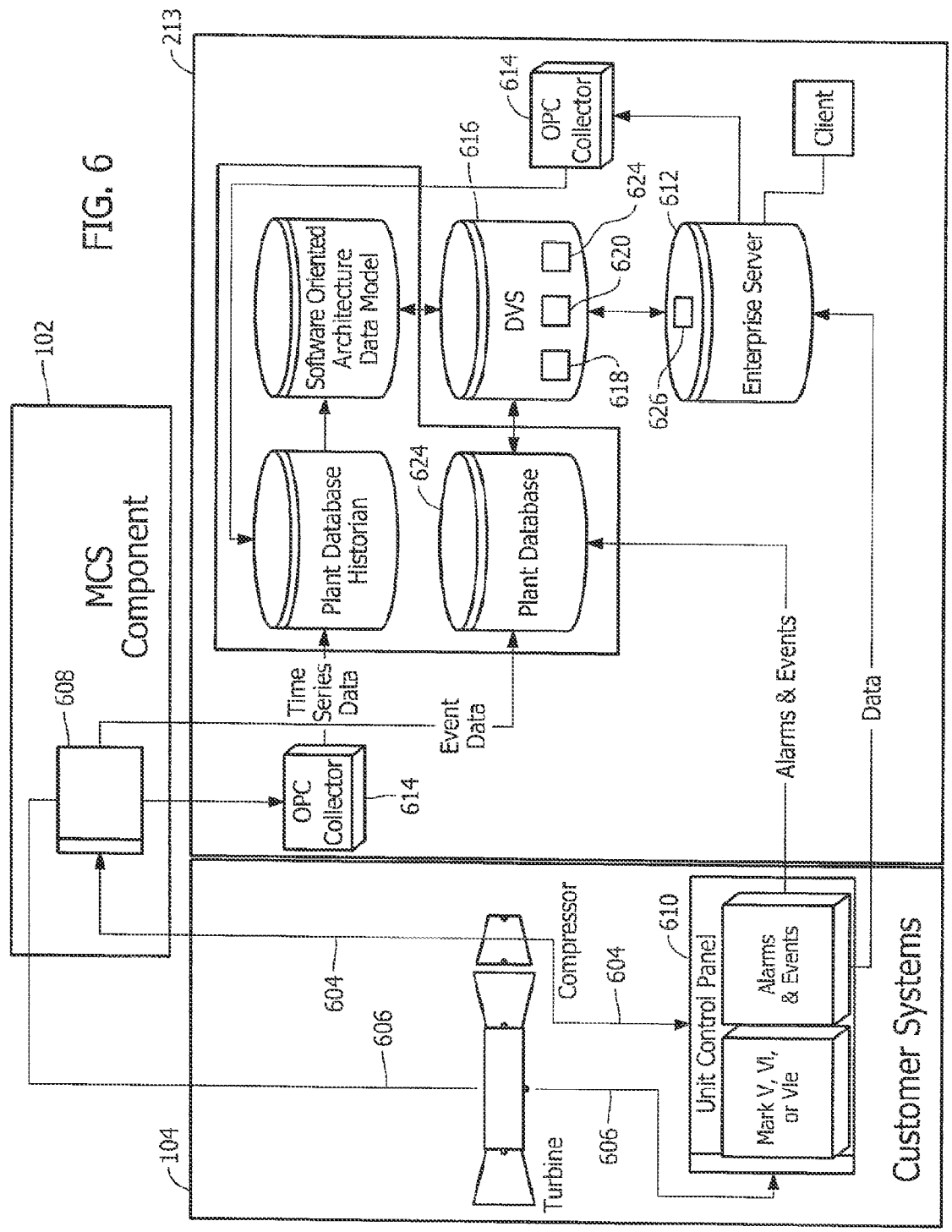

FIG. 6 is a schematic block diagram of a LMDS 213 communicatively coupled to a plant site 104 and a remote monitoring and diagnostic center 102. A single machinery train 602 is shown in the exemplary embodiment for clarity. However, any number of machines, components, trains, and systems can be used. Raw sensor data 604 and 606 is transmitted to a remote monitoring and diagnostic system 608 and to one or more local unit control panels 610.

In the exemplary embodiment, LMDS 213 includes an enterprise server 612 that is a client/server based visualization and control solution that facilitates visualization of plant operations, performing supervisory automation and delivering reliable information to higher-level analytic applications. Enterprise server 612 includes a graphics engine, dynamic time handling and the add on option digital graphical replay (DGR), to permit operators to precisely monitor and control the environment, equipment and resources of the plant.

Enterprise server 612 manages a real-time visibility technology to permit managing certain parts of a factory, a whole plant or a fleet from remote monitoring and diagnostic center 102. Enterprise server 612 also provides a Digital Graphic Replay (DGR) add-on recorder that permits recalling previous events for graphically analyzing events that occurred in the past.

An OPC collector 614 is an independent Data Access and XML DA client that captures OPC data from any DA or XML DA server, such as, but not limited to, remote monitoring and diagnostic system 608. OPC Collector 614 cooperates with other OPC compliant products to process the captured OPC data, store it, analyze it, or transfer it to database, file, or exchange modules.

OPC Collector 614 is a key component for production data acquisition (PDA) or data management tasks that permits relatively simple configuration of data for archival, temporary storage or processing.

A Dynamic Visualization System (DVS) 616 includes a Trend system 618 that facilitates visualizing the plant operation by trending the plant data for plant performance analysis and comparison. Users can select any plant tag from an organized plant specific system or graphically from emulated DCS screen displays for data trending with a window of time period from for example, one hour to one year from now or any specified date in the past. DVS also includes a Watch system 620 that facilitates displaying any specific plant HMI screens (e.g. SCADA, DCS screen) and feed them with live data in real-time. Watch system permits selection of a start time from a calendar to replay the plant operation live for the past in real-time, fast or slow mode. In addition, Watch system 620 is capable of collecting all the plant alarms and events and archiving them to an SQL Database, which is used to replace alarm and event logging printers, eliminating the long-term cost and reliability issues associated with printer hardware and their consumables. Moreover, when Watch system 620 is playing back a plant event for a selected time period, Watch system 620 provides an entire detailed view of the plant operation live and in real-time including the plant process response, alarm generation and operator activities.

DVS 616 includes an Alarm system 622 that provides hardware and software to facilitate collecting all the plant alarms and events in real-time and archiving them to an SQL Database 624 via serial line or network which is also used to replace the alarm and event logging printers, eliminating the long term cost and reliability issues associated with the printer hardware and their consumables. Moreover, Alarm system 622 integrates the plant alarms and events into Trend system 618, Watch system 620, Alarm system 622, and other modules which provide an entire detailed view of the plant operation live and in real-time including the plant process response, alarm generation and operator activities.

A Performance system 626 is a real-time performance supervision system which graphically displays all the Key Performance Indicators (KPI) for plant staff to monitor the plant performance, utilities usage and energy efficiency on line and in real-time. Perform system facilitates determining areas that can operate more efficiently and optimizing the overall process. This real-time performance supervision system provides insight into process capability, efficiency, and utilization. Perform system also provides analysis and alerts when the plant or system performance deviates from its statistical track.

Figure 7:
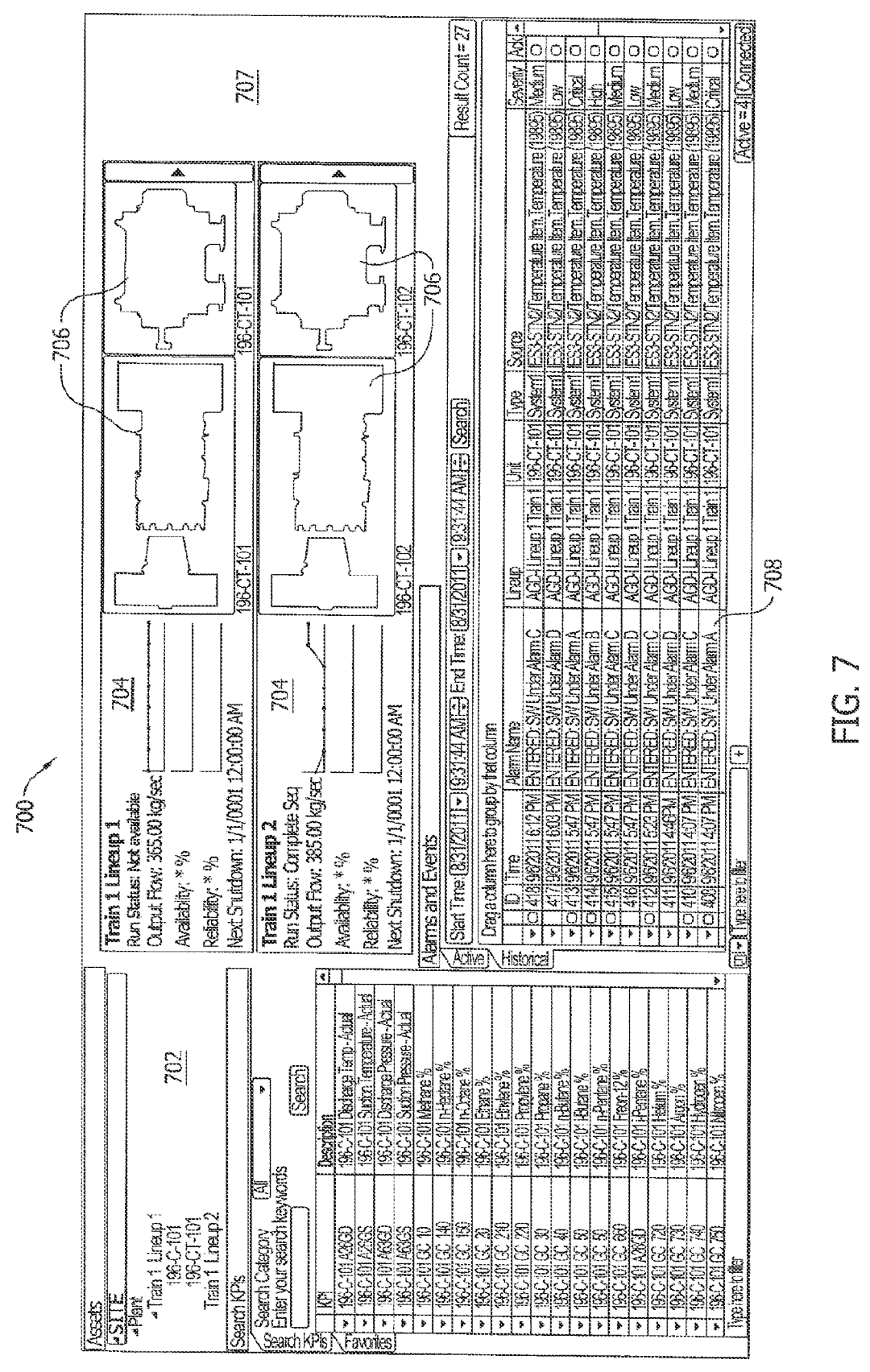

FIG. 7 is a screen capture of a Tier 1 view 700 that may be viewed through LMDS 213 or remote monitoring and diagnostic system 608 through the network connection. This screen capture is displaying a health summary for all the lineups or trains that are connected at each site, which are selectable using an asset tree window 702. Main production key performance indicators (KPIs) like run status, next planned shutdown as well as quick "right now" charts at output flow availability and reliability calculations are shown in a quick status window 704. Lineup colors of the mimic cartoon 706 in an analysis window 707 depict the most severe alarm status present at each unit, red for a high or critical alarm meaning a shutdown or a failed startup, orange for a medium alarm, yellow for a low alarm and green indicating healthy operation. Alarms and events are logged in an alarms and events window 708.

Figure 8:
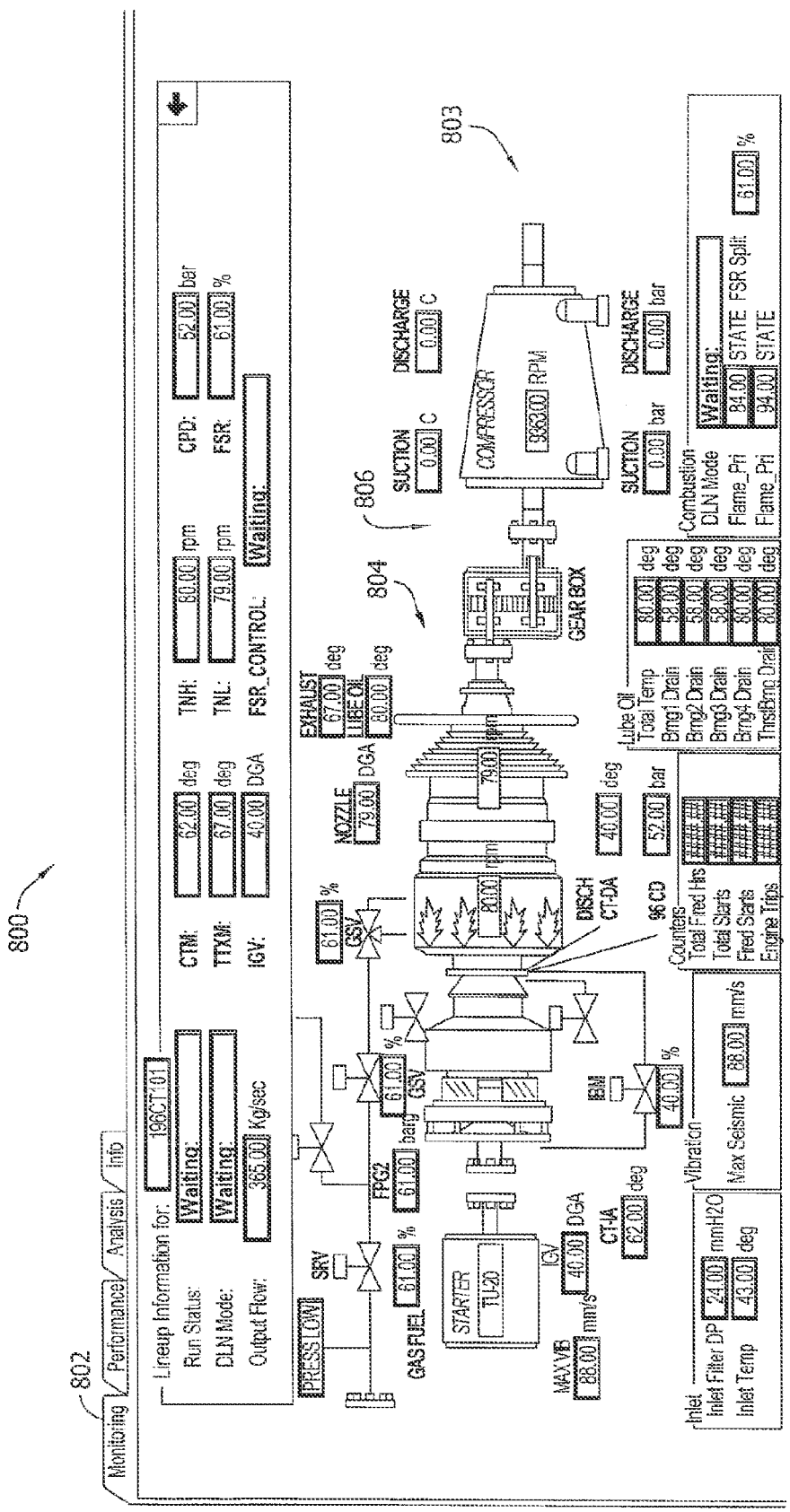

FIG. 8 is a screen capture of a Tier 2 view 800 that may be viewed after selecting a monitoring tab 802 from Tier 1 view 700 (shown in FIG. 7). Monitoring tab 802 provides an HMI Tier 2 lineup view containing a list of current key performance indicators (KPIs) for a machine train 803 including a gas turbine 804 and compressor 806. A status of machine train 803 illustrates a color display as well as the KPIs listed. There are many areas on the screen where the user can drill down for further detail. Clicking, for example, on gas turbine 804 provides a Tier 3 machine view.

Figure 9:
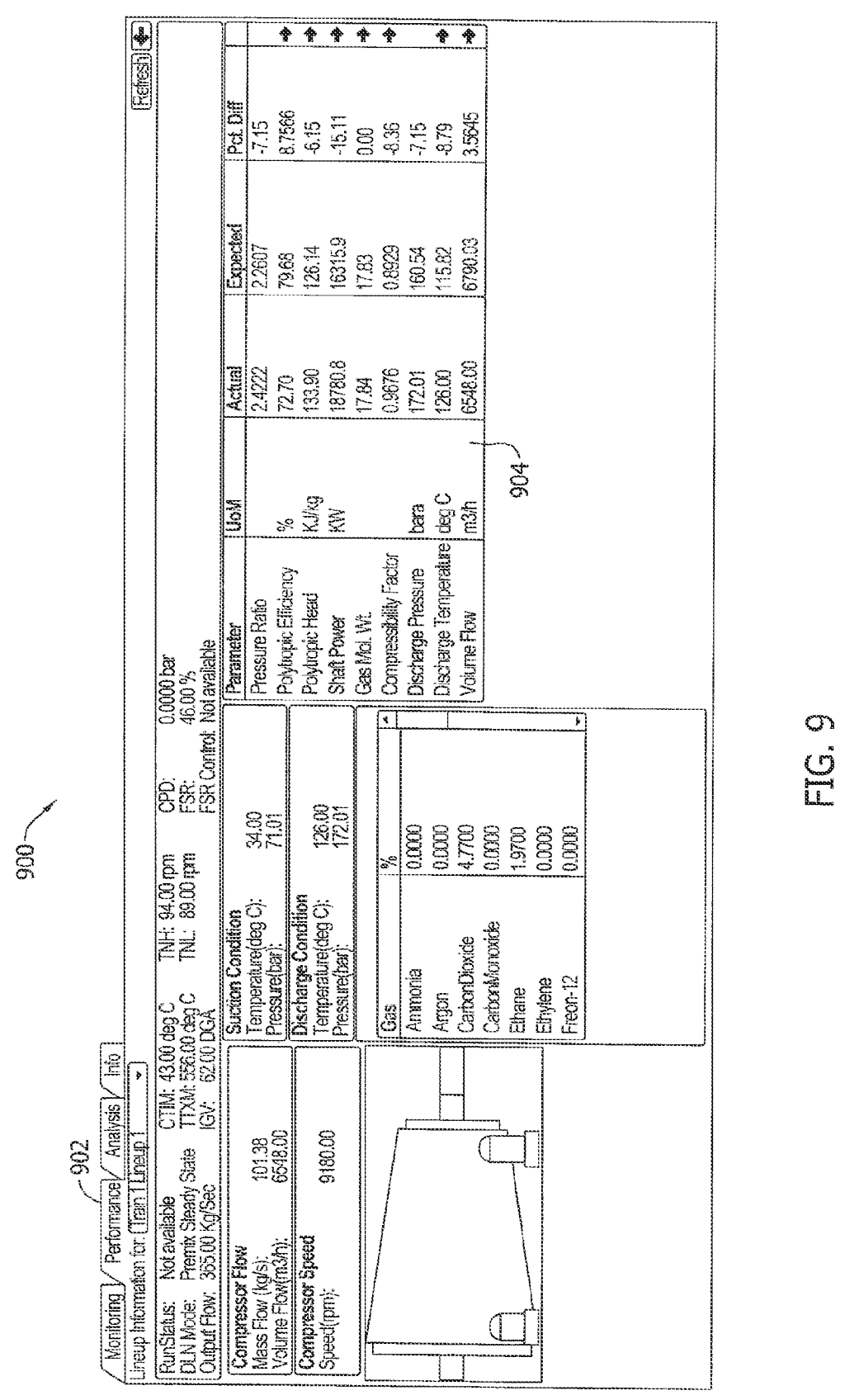

FIG. 9 is a screen capture of a Tier 3 view 900 that may be viewed after selecting a performance tab 902 from Tier 1 view 700 (shown in FIG. 7) or Tier 2 view 800 (shown in FIG. 8). All KPIs listed in Tier 3 view 900 are related to gas turbine 804 alone. There is also a separate Tier 3 view (not shown) for each compressor and for each other monitored component. From here the user can utilize any number of hyperlinks to drill down for more detail on various probes and measurements. Performance KPIs are displayed in a thermodynamic performance window 904 on performance tab 902. These KPIs include thermodynamic performance for both turbine and compressor. For a compressor this includes, for example, flow and speed. Users can select an individual KPI for more in-depth analysis that includes a live or once per minute view of the thermodynamic performance measures, for example, depicting the polytropic efficiency within the operating envelope of the centrifugal compressor. Clicking on vibration demonstrates the tier 4 or component view.

Figure 10:
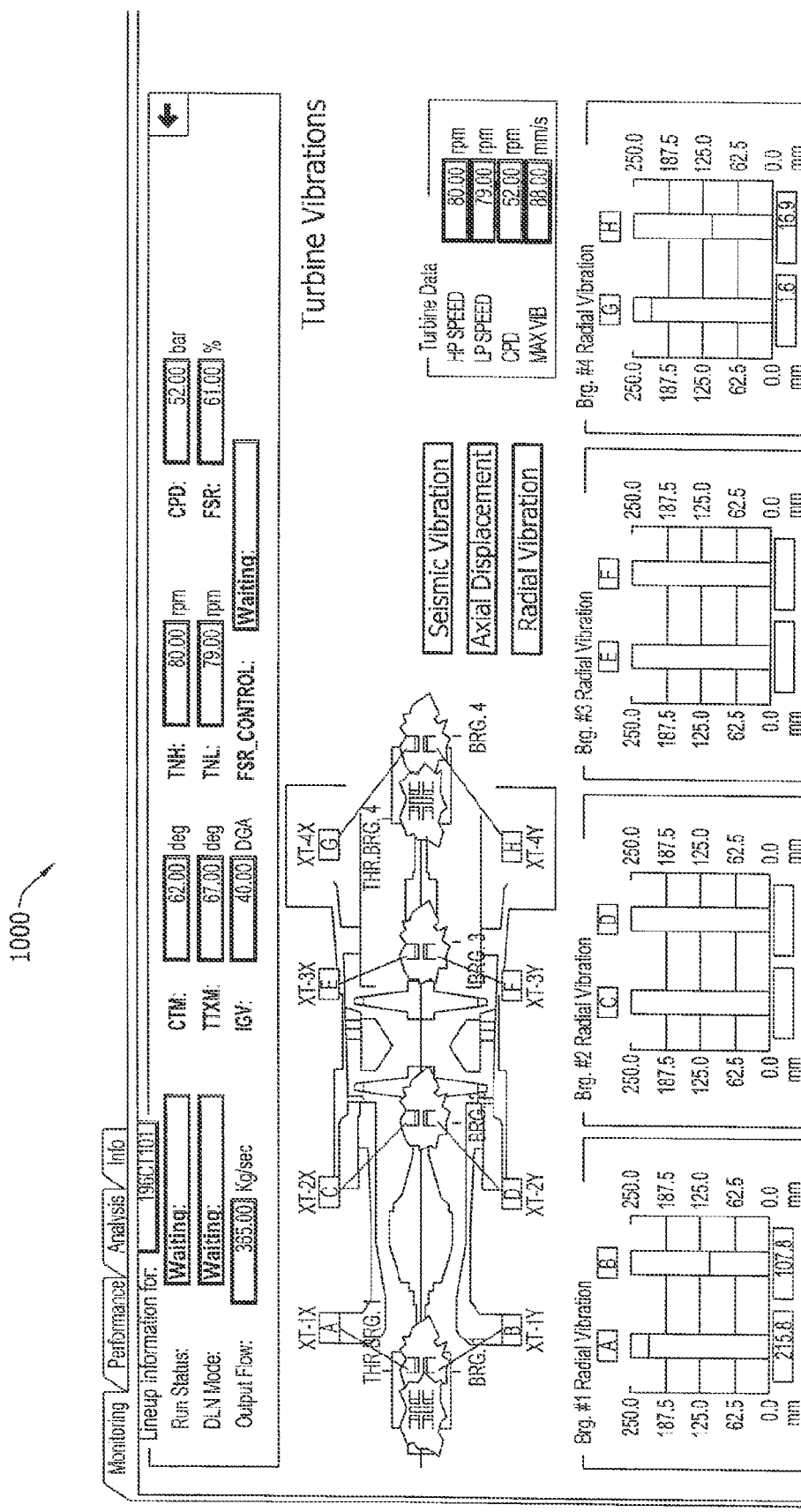

FIG. 10 is a screen capture of a Tier 4 view 1000 depicting vibration pickups in accordance with an exemplary embodiment of the present invention. From here, a user can drill into even more detail, including seismic, axial, or radial values of the vibration probes.

The analysis tab is a feature that when combined with the searchable KPI window features advanced charting tools to assist in expert analysis and trouble-shooting. Users can find specific KPIs, view trends from multiple KPIs on a single chart or in side-by-side charts, customize the time period for data analysis and use the slider to zoom into specific time periods. When satisfied with their analysis the user can add pretext comments, save the analysis as a pdf to send to a customer or peer for discussion and saving the analysis as a favorite for immediate recall at any time in the future.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for selectable local or remote monitoring and diagnostic services from an equipment supplier, OEM, or services provider. The center where the remote monitoring and diagnostic services are performed is selectively communicatively coupled to a local monitoring and diagnostic system at a plant site. The remote monitoring and diagnostic services center may communicate with the local monitoring and diagnostic system when given permissions to download software modules, updates to modules already executing on the local monitoring and diagnostic system, or provide remote diagnostic services. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of monitoring machinery and systems in a process plant using a local monitoring and diagnostic system provides a cost-effective and reliable means for monitoring machinery in a fleet of machines dispersed in remote areas of the world from a local system or from the remote fleet system. More specifically, the methods and systems described herein facilitate applying real-time OEM solutions to machinery located remotely from the OEM facilities. In addition, the above-described methods and systems facilitate maintenance of the plurality of complex physics-based rule sets that are used in the local monitoring and diagnostic system. As a result, the methods and systems described herein facilitate automatically monitoring and diagnosing the operation of a single plant or a fleet of plants in a cost-effective and reliable manner.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A local monitoring and diagnostic system for a plant, the system comprising:
   a client system comprising a user interface and a browser;
   a plant database configured to store rule sets, the rule sets comprising at least one rule expressed as at least one of a model of a plant component or system and a relational expression of a real-time data output relative to a real-time data input, the relational expression being specific to a plant asset or group of inter-related assets, the plant database is further configured to receive event data from a condition monitoring system associated with the plant, the condition monitoring system configured to analyze plant equipment data for real-time optimization of equipment and selected processes, condition monitoring, and event diagnostics to generate the event data; and
   a server grade computer configured to communicatively couple to the client system and the database, the server grade computer further configured to:
      receive plant component data from a plant unit control panel communicatively coupled to sensors positioned about the plant component,
      generate virtual sensor outputs using the at least one of the physics-based model, a data-driven model, and a empirical model and the relational expression associated with the plant component or system,
      transmit the plant component data and generated virtual sensor outputs to the plant database for storing and to a data visualization system for generating analytical graphics as requested by a user of the client system,
      determine using the at least one of the physics-based model, the data-driven model, and the empirical model rule set, an operating or performance condition of the plant component or system in near real-time, and
      output a visualization selected by a user representing the selected plant component or system, the visualization comprising graphics illustrating the plant component or system and textual information defining values of received and generated data relating to the selected plant component or system.

2. The local monitoring and diagnostic system in accordance with claim 1, wherein the model comprises at least one of a physics-based model, a data-driven model, and a empirical model of the plant component or system.

3. The local monitoring and diagnostic system in accordance with claim 2, wherein the server grade computer is further configured to receive a rule set generated by an original equipment manufacturer (OEM) of a component associated with the rule set or by a third party entity.

4. The local monitoring and diagnostic system in accordance with claim 3, further comprising a remote communications system, wherein the server grade computer is further configured to communicatively couple to a fleet management center using the remote communications system, and to transmit information stored in the database relating to an operation of at least one of the plant components or systems in response to received requests from a subject matter expert located remotely from the plant and receive modifications to one or more of the rule sets based on the transmitted information.

5. The local monitoring and diagnostic system in accordance with claim 2, further comprising a remote communications system, wherein the server grade computer is further configured to communicatively couple to a fleet management center using the remote communications system, and to transmit information stored in the database relating to an operation of at least one of the plant components or systems in response to received requests from a subject matter expert located remotely from the plant and receive modifications to one or more of the rule sets based on the transmitted information.

6. The local monitoring and diagnostic system in accordance with claim 1, wherein the server grade computer is further configured to receive a rule set generated by an original equipment manufacturer (OEM) of a component associated with the rule set or by a third party entity.

7. The local monitoring and diagnostic system in accordance with claim 6, further comprising a remote communications system, wherein the server grade computer is further configured to communicatively couple to a fleet management center using the remote communications system, and to transmit information stored in the database relating to an operation of at least one of the plant components or systems in response to received requests from a subject matter expert located remotely from the plant and receive modifications to one or more of the rule sets based on the transmitted information.

8. The local monitoring and diagnostic system in accordance with claim 1, further comprising a remote communications system, wherein the server grade computer is further configured to communicatively couple to a fleet management center using the remote communications system, and to transmit information stored in the database relating to an operation of at least one of the plant components or systems in response to received requests from a subject matter expert located remotely from the plant and receive modifications to one or more of the rule sets based on the transmitted information.

9. A method of monitoring machinery and systems in a process plant using a local monitoring and diagnostic system, the local monitoring and diagnostic system comprising a database of at least one rule set, the rule set comprising at least one rule expressed as a model of at least a portion of at least one of a machine, a system, and combinations thereof, the method comprising:
- receiving from sensors communicatively coupled to the local monitoring and diagnostic system process parameter values relating to an operation of the at least a portion of at least one of a machine and a system in the plant;
- determining by the local monitoring and diagnostic system virtual sensor values for process parameters relating to the operation of the at least a portion of at least one of a machine and a system in the plant;
- applying the received system process parameter values and the determined virtual sensor values to the at least one rule to generate operating performance values and diagnostic values relating to the operation of the monitored machinery or system; and
- generating by the local monitoring and diagnostic system a tiered visualization of graphic representations of the monitored machinery or system in the plant comprising the received process parameter values and virtual sensor values, wherein each tier of visualizations comprises a graphic representation presented in greater detail than a previous tier.

10. The method in accordance with claim 9, wherein the model comprises at least one of a physics-based model, a data-driven model, and a empirical model of the plant component or system.

11. The method in accordance with claim 9, further comprising preventing the local monitoring and diagnostic system from communicating with an off-site entity.

12. A monitoring and diagnostic system for a fleet of plants, the system comprising:
- a client system associated with each plant, each client system comprising a user interface and a browser;
- a plant database associated with each plant, each plant database configured to store rule sets relative to components located at that plant, the rule sets comprising at least one rule expressed as at least one of a model of a plant component or system and a relational expression of a real-time data output relative to a real-time data input, the relational expression being specific to a plant asset or group of inter-related assets, the plant database is further configured to receive event data from a condition monitoring system associated with the plant, the condition monitoring system configured to analyze plant equipment data for real-time optimization of equipment and selected processes, condition monitoring, and event diagnostics to generate the event data;
- a fleet database located remotely from the fleet of plants, the fleet database configured to receive plant performance and operations data from a selectable number of plants in the fleet, the plant performance and operations data comprising historical plant data and near real-time plant data; and
- a server grade computer configured to communicatively couple to the client systems and the database, the server grade computer further configured to:
  - receive plant component data from a plant unit control panel communicatively coupled to sensors positioned about the plant component,
  - generate virtual sensor outputs using the at least one of the at least one of the physics-based model, a data-driven model, and a empirical model and the relational expression associated with the plant component or system,
  - transmit the plant component data and generated virtual sensor outputs to the plant database for storing and to a data visualization system for generating analytical graphics as requested by a user of the client system,
  - determine using the at least one of the physics-based model, the data-driven model, and the empirical model rule set, an operating or performance condition of the plant component or system in near real-time, and
  - output a visualization selected by a user representing the selected plant component or system, the visualization comprising graphics illustrating the plant component or system and textual information defining values of received and generated data relating to the selected plant component or system.

13. The monitoring and diagnostic system in accordance with claim 12, wherein the at least one of the physics-based model, the data-driven model, and the empirical model of the plant component or system comprises proprietary data of an original equipment manufacturer of the plant component or system.

14. The monitoring and diagnostic system in accordance with claim 13, wherein the server grade computer is configured to receive a rule set generated by an original equipment manufacturer (OEM) of a component associated with the rule set or by a third party entity.

15. The monitoring and diagnostic system in accordance with claim 12, wherein the server grade computer is configured to receive a rule set generated by an original equipment manufacturer (OEM) of a component associated with the rule set or by a third party entity.

* * * * *